April 20, 1971  D. B. SULLENGER  3,575,874
NUCLEAR FUEL CONTAINING PLUTONIUM BOROCARBIDES
Filed April 29, 1969
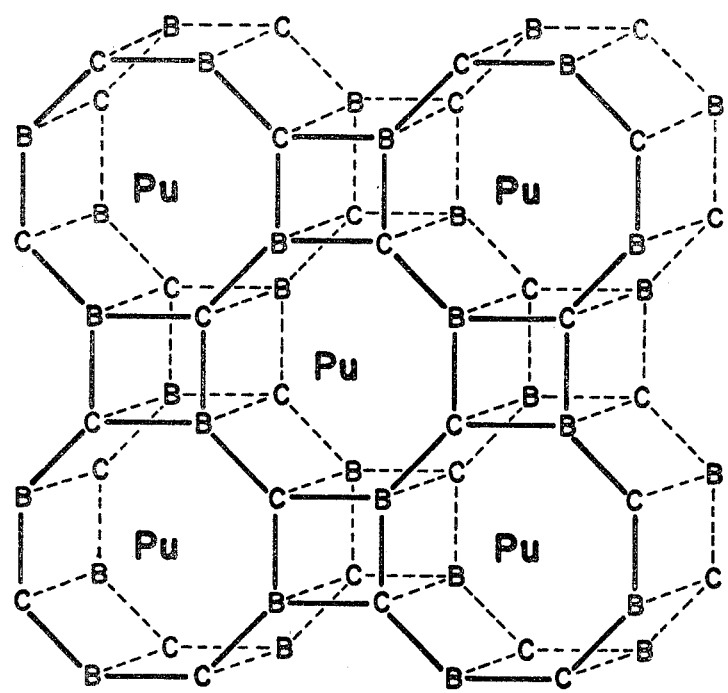
INVENTOR.
DON B. SULLENGER
BY

United States Patent Office 3,575,874
Patented Apr. 20, 1971

3,575,874
NUCLEAR FUEL CONTAINING PLUTONIUM BOROCARBIDES
Don B. Sullenger, Centerville, Ohio, assignor to the United States of America as represented by the United States Atomic Energy Commission
Filed Apr. 29, 1969, Ser. No. 820,195
Int. Cl. C01g 56/00
U.S. Cl. 252—301.1  2 Claims

ABSTRACT OF THE DISCLOSURE

A ceramic fuel for breeder reactors or the like having high radiation and thermal stability selected from the group of plutonium borocarbides and plutonium boronitrides, uranium being substitutable for or includable with the plutonium, and the boron constituent being essentially boron-11.

BACKGROUND OF INVENTION

Fast breeder nuclear reactors are being developed at a rapid rate as a primary source of energy for future electrical and other power generators and power systems. The primary advantage of this type of reactor is that with proper selection of reactor fuels, the reactor may produce new and additional fissionable material fuel (plutonium-239) by uranium-238 neutron capture during operation. It is desirable in most applications that the breeder reactor fuel include some plutonium initially to provide the desired high neutron flux level for efficient uranium neutron capture.

Such reactors, in order to provide high performance must be operated under extremely difficult reactor core material environmental conditions. For example, with sodium cooled fast breeder reactors, the sodium coolant may operate at about 650° C. with fuel temperatures as high as about 2200° C. while being subjected to high neutron flux levels. A fast breeder reactor requires a reactor fuel which may withstand these operating conditions and reactor environment for long periods of time, such as for about three years, without substantial degradation. Therefore, fast breeder reactor fuel, in addition to providing suitable neutron capture material and a high level of neutrons, should be compatible with its cladding and have excellent thermal irradiation stability, a high melting temperature, predictable thermal expansion characteristics, high thermal conductivity, as well as other desirable properties.

SUMMARY OF INVENTION

It is an object of this invention to provide new ceramic fuels suitable for use in a fast breeder reactor or the like.

It is a further object of this invention to provide new compositions having high temperature stability and high melting points.

Various other objects and advantages will appear from the following description of one embodiment of the invention, and the most novel features will be particularly pointed out hereinafter in connection with the appended claims.

The invention comprises a fuel including fissionable material boronitride or borocarbide compositions, the boron constituent being essentially boron-11.

DESCRIPTION OF DRAWING

The drawing shows the crystal structure of one embodiment of this invention.

DETAILED DESCRIPTION

Natural boron may have a thermal neutron cross section of from about 758 to 771 barns and is commonly used in either its natural state or in the purified or enriched isotope form of boron-10 (thermal neutral cross section of about 3840 barns) as a neutron blanket or poison in reactor and the like applications. It has been found that enriched boron-11, which has a thermal neutron cross section of less than about 0.05 barn, may be reacted with either carbon or a nitride and with plutonium or a plutonium-uranium mixture to form a compound having highly desirable fast breeder reactor fuel properties.

An amount of boron-11 powder or particles may be intimately mixed with graphite or carbon powder (or a nitride powder) with conventional powder mixing techniques and apparatus. The mixture may then be formed into a pellet for easy handling by conventional techniques such as pressing (at about 7000 gm./cm.$^2$ if pelletizing graphite is used, about 70,000 gm./cm.$^2$ otherwise). Pellet formation may avoid loss of boron and or carbon due to scattering during the course of the reaction. An amount of plutonium (or plutonium-uranium mixture), stoichiometric or otherwise, may then be placed on top of the pressed boron-carbon pellet in a suitable hearth sample recess of an electric arc furnace. The reaction chamber may be evacuated to about 1 micron pressure and refilled to approximately one third atmosphere with a dried inert gas which also has an appreciable thermal conductivity, for example, argon. An arc may be struck from a maneuverable electrode made of some non-reactive high melting material, such as tungsten or molybdenum, to an oxygen getter material, such as zirconium, positioned in another sample recess of the hearth. After the getter material has been heated sufficiently to react with, and therefore, to remove the oxygen and water vapor still remaining in the chamber atmosphere, the arc may be transferred to the top of the reactant pellet by movement of the electrode across the hearth. By proper adjustment of the input power the upper portion of the pellet (say, one half) may be sufficiently heated by the arc to initiate the reaction (which is highly exothermic if $PuB_2C_2$ stoichiometry is obtained) between the constituents to form the desired compound. Contamination may be held to a minimum by proper adjustment of the input power so that the lower portion of the pellet remains cold and the reaction essentially occurs in a container of the reacting materials. The hearth is cooled by a generous water flow through the hearth, which may be made of a good thermal conductor, like copper. Power to the arc may be shut off and the movable electrode may then be used as a probe with which to flip over the pellet for similar reaction of the constituents of its other portion. The arc may be again struck, etc., and the procedure repeated several times to obtain homogeneity of the product.

The specific compound resulting from this reaction may depend on the initial quantities of starting materials. For example 24 grams of carbon, 22 grams of boron-11 and 239 grams of plutonium-239 may result in the formation of about 285 grams of the plutonium borocarbide $PuB_2C_2$. Investigations indicate that this compound has a crystal structure as shown in the drawing. Other borocarbide and boronitride compounds which may result from the selection of constituent amounts include $Pu_2B_2C_2$, $PuBC$, $Pu_2BC$, $PuB_2N_2$, $Pu—UB_2C_2$, $Pu—UBC$, as well as others with an attendent variation in crystal structure.

A $PuB_2C_2$ compound fuel system subjected to temperatures up to about 1200° C. while in contact with tantalum and air for periods of from about 10 to 14 days exhibited no evidence of a reaction or oxidation. The melting point of the compound $PuB_2C_2$ is greater than about 2000° C. while the thermal conductivity and electrical conductivity is between that of the metal and the corresponding plutonium or uranium borides, carbides, nitrides or oxides. The thermal neutron cross section remained at the lowe levels attributable to the boron-11 and other constituents.

These compounds thus provide a new family of fissionable material fuels which exhibit the desirable thermal characteristics, such as high melting point, temperature and chemical stability and high thermal conductivity, as are necessary for use in such as fast breeder reactor applications. These characteristics may be achieved with a boron compound without the undesirable high thermal neutron cross section usually considered with boron containing materials.

These compounds, particularly those including alpha emitting 238 Pu, may also be used as heat sources in conventional thermoelectric or the like power supplies where very high temperature operation is desired.

It will be understood that various changes in the details and materials, which have been herein described and illustrated in order to explain the nature of the invention, may be made by those skilled in the art within the principles and scope of the invention as expressed in the appended claims.

What is claimed is:

1. A ceramic nuclear fuel composition having high radiation and thermal stability selected from the group consisting of plutonium borocarbides, plutonium boronitrides, plutonium-uranium borocarbides and plutonium-uranium boronitrides, the boron constituent being essentially boron-11.

2. A ceramic nuclear fuel consisting essentially of $PuB_2C_2$, the boron constituent being essentially boron-11.

References Cited

UNITED STATES PATENTS

| | | | |
|---|---|---|---|
| 2,600,370 | 6/1952 | Schlesinger et al. | 23—346 |
| 3,122,509 | 2/1964 | Handwerk et al. | 252—301.1 |
| 3,150,929 | 9/1964 | Wentorf | 252—301.1 |
| 3,320,176 | 5/1967 | Davis | 252—301.1 |
| 3,334,974 | 8/1967 | Fletcher et al. | 23—345 |
| 3,368,877 | 2/1968 | Guybon et al. | 23—344 |
| 3,379,647 | 4/1968 | Smudski | 23—344 |
| 3,431,329 | 3/1969 | White et al. | 252—301.1 |

OTHER REFERENCES

Lobanov et al.: Spontaneously Fissile Isomer with 0.9-m. sec. Half Life Nuclear Science Abstracts, vol. 19, #19, October 1965, Abstract #37881.

CARL D. QUARFORTH, Primary Examiner

F. M. GITTES, Assistant Examiner

U.S. Cl. X.R.

23—344, 346; 264—0.5